May 13, 1952     J. B. BOYETT, SR     2,596,643
TRANSMISSION UNIT Filed Aug. 27, 1948     9 Sheets-Sheet 1

Inventor

Jesse B. Boyett, Sr.

By

Kimmel & Crowell Attys.

May 13, 1952     J. B. BOYETT, SR     2,596,643
TRANSMISSION UNIT Filed Aug. 27, 1948     9 Sheets-Sheet 2

Inventor
Jesse B. Boyett, Sr.

By
Kimmel & Crowell Attys.

May 13, 1952      J. B. BOYETT, SR      2,596,643
TRANSMISSION UNIT Filed Aug. 27, 1948      9 Sheets-Sheet 3

Fig. 3.

Inventor
Jesse B. Boyett, Sr.
By Kimmel & Crowell Attys.

May 13, 1952     J. B. BOYETT, SR     2,596,643
TRANSMISSION UNIT Filed Aug. 27, 1948     9 Sheets-Sheet 6

Inventor
Jesse B. Boyett, Sr.
By
Kimmel & Crowell Attys.

May 13, 1952     J. B. BOYETT, SR     2,596,643

TRANSMISSION UNIT

Filed Aug. 27, 1948     9 Sheets-Sheet 8

Inventor
Jesse B. Boyett, Sr.
By
Kimmel & Crowell Attys.

Patented May 13, 1952

2,596,643

UNITED STATES PATENT OFFICE 2,596,643

TRANSMISSION UNIT

Jesse B. Boyett, Sr., Nashville, Ga.

Application August 27, 1948, Serial No. 46,430

1 Claim. (Cl. 74—417)

This invention relates to a mobile spraying machine, and is an improvement over the construction embodied in my prior Patent No. 2,022,584, issued November 26, 1935, for Mobile Spraying Machine.

An object of this invention is to provide in a mobile spraying machine, an improved driving means for the pump and agitator which will facilitate assembly of the driving means and practically eliminate wear.

With the above and other objects in view, my invention consists in the arrangement, combination and details of construction disclosed in the drawings and specification, and then more particularly pointed out in the appended claim.

In the drawings:

Figure 11 is a sectional view taken on the line 11—11 of Figure 9.

Figure 1:
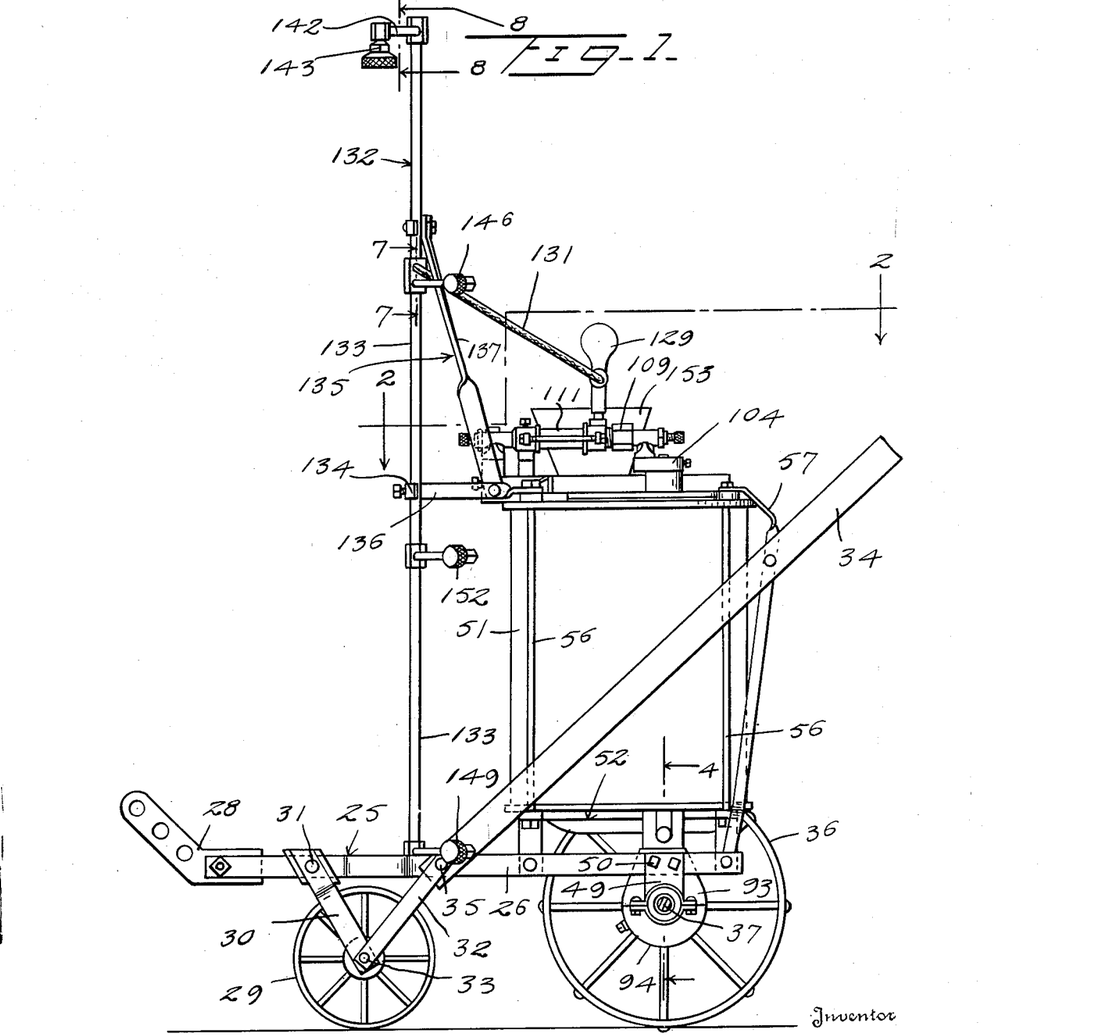
Figure 1 is a detail side elevation, partly broken away, of a mobile spraying machine constructed according to an embodiment of my invention.
Figure 2:
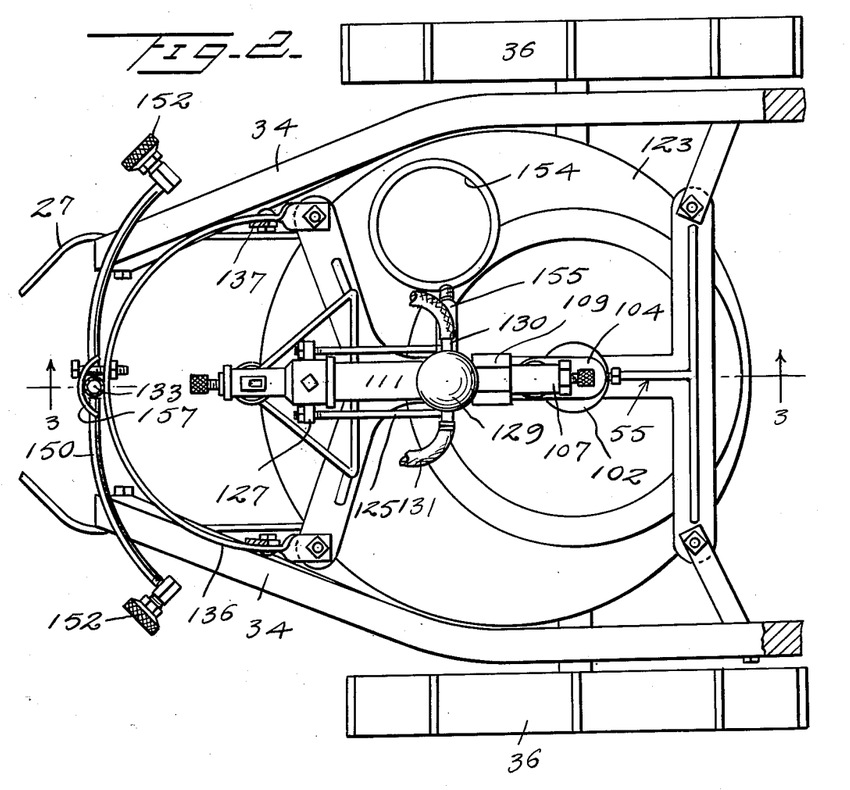
Figure 2 is a sectional view taken on the line 2—2 of Figure 1.

Referring to the drawings and first to Figures 1 to 8 inclusive, the numeral 25 designates generally a mobile frame which is formed of frame bars 26 having forwardly convergent end portions 27 which are connected together to a hitch member 28, as indicated in Figure 1.

The frame 25 has disposed beneath the forward portion thereof a front wheel 29 rotatably carried by a pair of downwardly and rearwardly extending arms 30 which are secured as at 31 to the frame 25. A pair of bracing bars 32 are connected between the axle 33 of the wheel 29 and the frame 25. A pair of upwardly and rearwardly extending handlebars 34 are secured as at 35 to the frame 25, and project upwardly and rearwardly so that the frame structure may be properly guided as it is being pulled over the surface of the ground.

Figure 4:
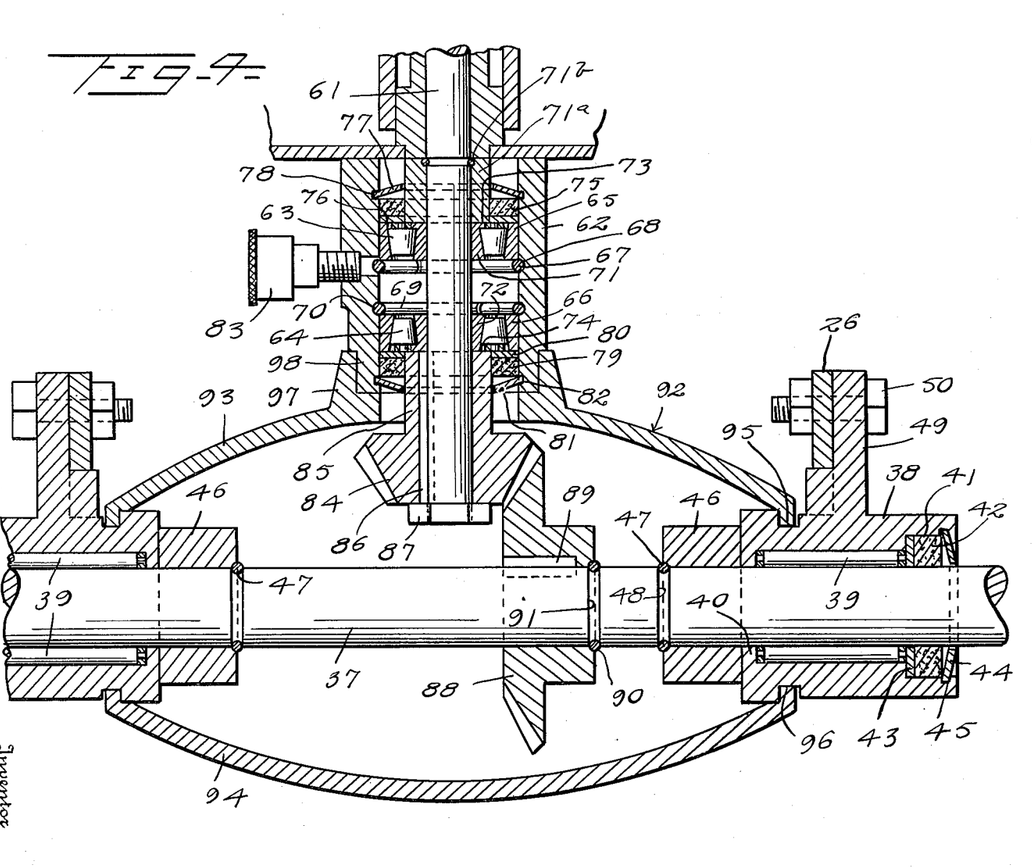
Figure 4 is a fragmentary sectional view taken on the line 4—4 of Figure 1.

The frame 25 has disposed at the rear portion thereof a pair of traction wheels 36 which are secured to a drive shaft 37 which is rotatably mounted, as shown in Figure 4, in a pair of bearing bushings 38 which are secured to the frame bars 26. The bearing bushings 38 have mounted therein roller bearings 39, and the bushings 38 are formed at their inner ends with an annular flange 40 against which the inner ends of the rollers 39 engage. The bushings 38 are formed with a counterbore 41 at their upper portion within which a felt packing or sealing member 42 is mounted. A metal washer 43 is interposed between the felt 42 and the outer end of the roller structure 29. The felt washer 42 is firmly secured in the counterbore 41 by means of a frusto-conical locking washer 44 which engages in an annular offset groove 45 formed in the counterbore 41. The washer 44 is initially formed to readily pass into the counterbore 41 and when in the position to engage in the groove 45 the washer 44 is struck or otherwise pressed inwardly at the apex thereof so that this washer will flatten out and will thereby engage within the annular groove 45 which forms a keeper for the lock washer.

The shaft 37 is held against endwise movement relative to the bearing bushings 38 by means of a pair of collars 46 which bear at their outer sides against the inner ends of the bushings 38 and the collars 46 are locked against inward movement by means of split lock rings 47 engaging in grooves 48 which are formed in the shaft 37. The bushings 38 have an upwardly projecting lug 49 formed integral therewith, which is secured by fastening means 50 to an adjacent side frame bar 26.

A tank 51 is mounted on the mobile frame 25, the tank 51 being seated on a base member generally designated as 52. The base member 52 includes pairs of depending arms 53 which are secured by fastening means 54 to the frame bars 26. A top plate 55 is disposed on the upper end of the tank 51 and the tank 51 is clamped between the plate 55 and the base 52 by means of clamping bolts 56.

The handles 34 are braced at the rear portion of the tank 51 by means of bracing bars 57 which are fixed between the top plate 55 and the rearmost arms 53 of the base 52. The tank 51 has fixed therein a tube 58, the tube 58 being fixed at its lower end, as at 59, to the bottom wall 60 of the tank 51. A pump operating shaft as 61 is rotatably mounted within the tube 58 and extends downwardly below the bottom wall 60 and through a bearing bushing 62 which is carried by the base 52.

Figure 3:
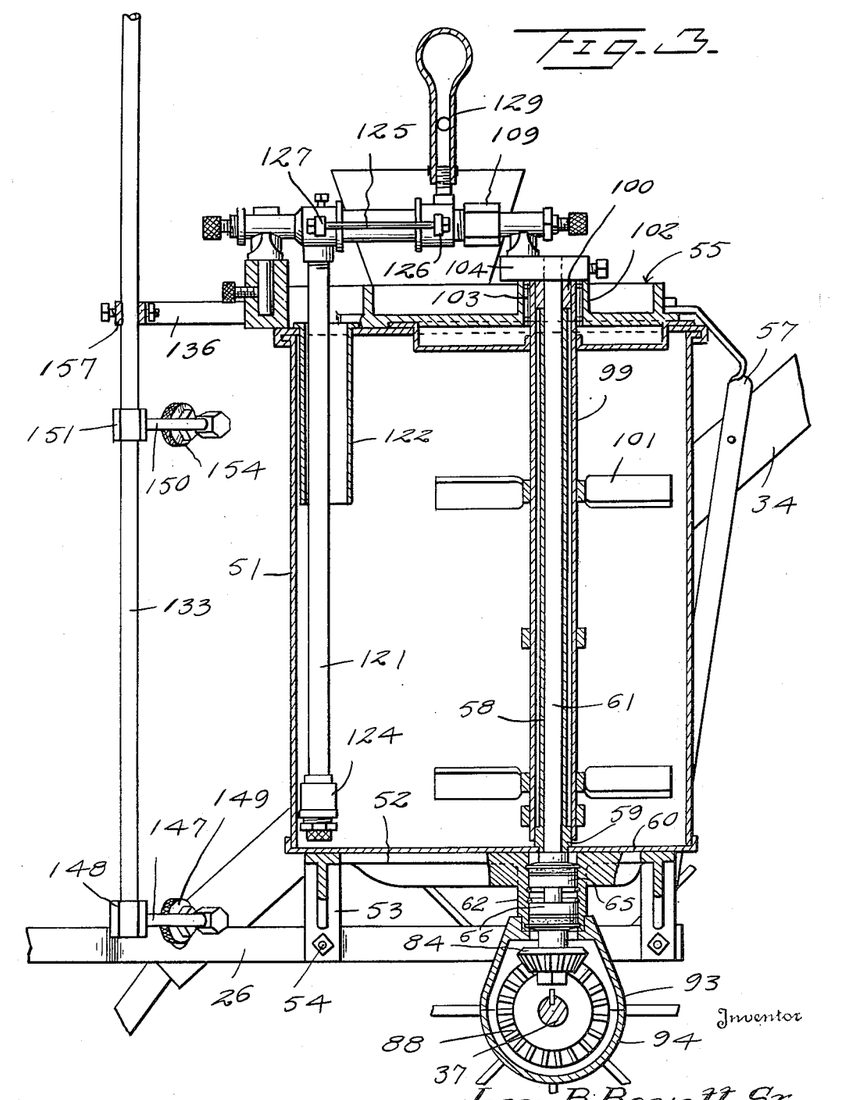
Figure 3 is a fragmentary vertical section taken substantially on the line 3—3 of Figure 2.

The bushing 62 has mounted therein a pair of oppositely disposed roller bearing members 63 and 64 which include outer races 65 and 66 respectively. The race 65 is held against downward movement by means of a split locking ring 67 engaging in a groove 68 formed in the bushing 62, and the race 66 is held against upward movement by means of a split locking ring 69 engaging in a groove 70 formed in the bushing 62.

The shaft 61 has mounted thereon a pair of substantially cone-shaped inner race members 71 and 72 correlated with the roller bearing members 63 and 64 respectively, and the inner race 71 is formed at its small end with an annular flange 73 which is adapted to bear against the large ends of the rollers 63. The inner race 72 is formed with an annular flange 74 bearing against the large ends of the rollers 64.

A thrust collar 71a is disposed in bushing 62 about shaft 61 bearing against the upper roller bearing, and collar 71a is held against upward movement by means of a split lock ring 71a.

A felt sealing ring 75 is disposed in the upper portion of the bushing 62, bearing at its lower side against a metal washer 76 which engages against the upper end of the races 65 and 71, and a frusto-conical locking washer 77 which engages in an annular groove 78 formed in the bushing 62 locks the washer 75 against upward movement. A lower felt washer 79 is disposed in the lower portion of the bushing 62 and a metal washer 80 is interposed between the lower roller bearing structure and the upper side of the felt washer 79.

A frusto-conical lock washer 81 engages in the annular groove 82 formed in the lower portion of the bushing 62 and holds the lower washer 79 against downward movement.

A grease cup 83 is threaded into the bushing 62 between the two roller bearing members so that those members may be properly lubricated. The shaft 61 has fixed on the lower end thereof a beveled gear or pinion 84, the gear 84 being formed with a hub 85 which is adapted to bear against the lower end of the inner race 72. The gear 84 is held against rotation by means of a key 86 and a nut 87 is threaded on the shaft 61. The gear 84 may be adjusted endwise by means of the nut 87 so that any wear in the roller bearings may be readily taken up. The gear 84 meshes with a beveled driving gear 88 which is fixed on the shaft 37 by means of a key 89. The gear 88 is held against endwise movement in at least one direction, which is the direction of the strain applied thereto, by means of a locking ring 90 which engages in an annular groove 91 formed in the shaft 37.

A gear housing generally designated as 92 engages about the gears 84 and 88 and also provides a means whereby the frame bars 26 and the bearing bushings 38 will be held against lateral strain or bending. The housing 92 is formed of complementary upper and lower substantially ovoidal housing members 93 and 94, which at their outer ends are formed with flanges 95 engaging in annular grooves 96 which are formed in the bearing bushings 38. The housing 92 is formed with an upwardly projecting bushing 97 within which the reduced lower end 98 of the bushing 62 engages.

The shaft 61 has fixed adjacent the upper end thereof an agitator tube or sleeve 99, the sleeve 99 having a bushing 100 fixed in the upper end thereof which is adapted to be secured by suitable means to the shaft 61 above the upper end of the tube 58. The tube or sleeve 99 has fixed thereto a plurality of agitator blades 101 engaging within the tank 51 so that the insecticide will be thoroughly agitated with the rotation of the shaft 61.

Figure 5:
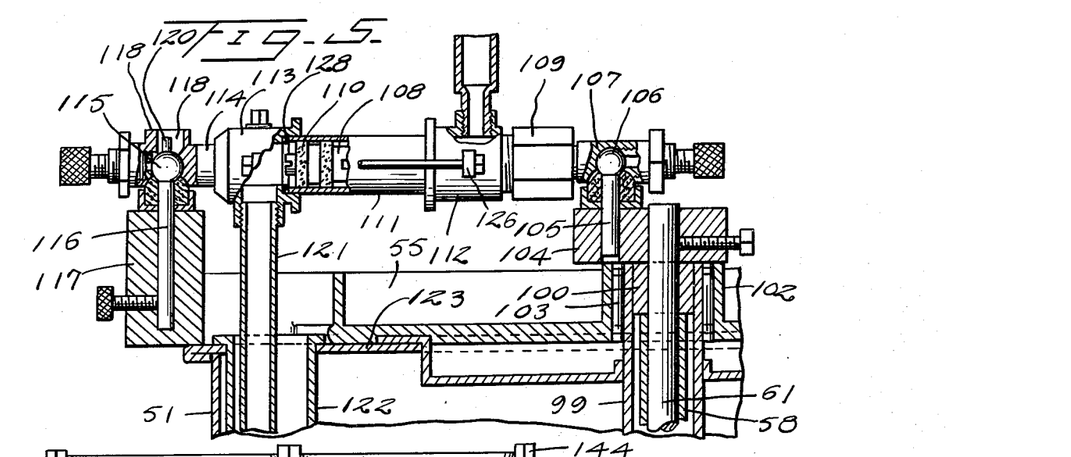
Figure 5 is a fragmentary sectional view of the pump structure.

A bearing bushing 102 is carried by the top member 55 and a roller bearing 103 is disposed in the bushing 102 and engages about the upper end of the sleeve or tube 99. A crank 104 is fixed on the upper end of the shaft 61 and the crank 104 has secured thereto, as shown in Figure 5, a crank pin 105 which is formed with a ball member 106. The ball member 106 engages in a ball socket 107 which is carried by a piston rod 108 which is slidable through a gland 109. The piston rod 108 has fixed thereto a piston 110 which is slidable in a pump cylinder 111. The cylinder 111 includes a head 112 at the inner end thereof, and also includes a head 113 at the outer or forward end thereof.

The head 113 is formed with a forwardly projecting ball socket 114 within which a ball pivot member 115 rotatably engages. The pivot member 115 includes a shank 116 which extends downwardly into a bushing 117 carried by the head or top member 55. The socket member 114 is formed with upwardly offset boss 118 having a slot 119 within which a pin 120 extending upwardly from the ball 115, loosely engages. The pin 120 cooperates with the slot 119 in the boss 118 in holding the head 113 against rotation about a horizontal axis.

The head 113, which is the suction head, has extending downwardly therefrom a pipe 121 which extends downwardly through a tube 122 carried by the top wall 123 of the tank 51. The tube 121 extends to substantially the bottom of the tank 51 and is formed with a bushing 124 having a suction head disposed therein, of conventional construction.

The cylinder 111 of the pump is sealingly secured in the heads 112 and 113 by means of a pair of bolts 125 engaging through ears 126 and 127 carried by the heads 112 and 113 respectively. The ends of the cylinder 111 bear against a compressible sealing gasket 128 which may be in the form of a lead gasket or the like so that the cylinder 111 will be tightly disposed within the heads 112 and 113. The head 112 has secured thereto a dome 129 which is formed with a pair of outlet nipples 130 with which a pair of flexible tubes 131 are connected.

Figures 6, 8:
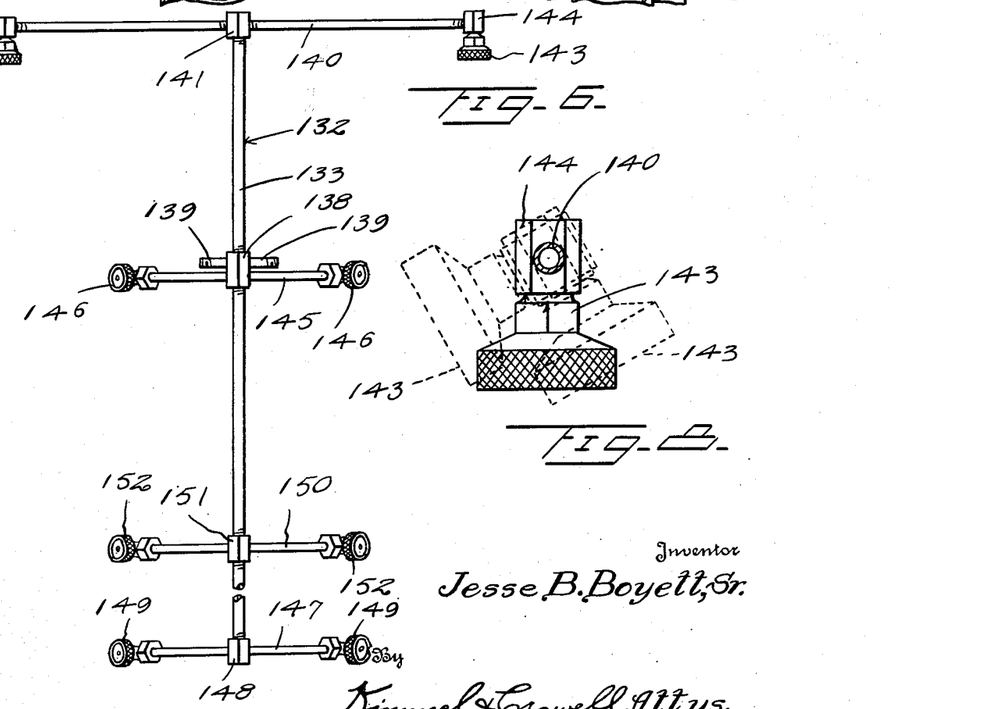
Figure 6 is a detail front elevation of the spraying boom.
Figure 8 is a fragmentary sectional view taken on the line 8—8 of Figure 1.
Figure 7:
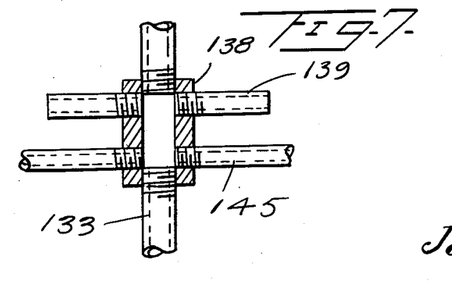
Figure 7 is a fragmentary sectional view taken substantially on the line 7—7 of Figure 1.

A spraying boom generally designated as 132 is mounted on the forward end of the machine and includes a vertically disposed pipe 133 which is secured by clamping members 134 to a supporting bracket generally designated as 135. The bracket 135 includes a lower arcuate bar 136 and a pair of upwardly convergent bars 137. The pipe 133 has interposed in the length thereof a coupling 138 and a pair of laterally extending nipples 139 are carried by the coupling 138 and the forward ends of the tubes or hose members 131 are connected with the nipples 139.

The pipe 133 has secured to the upper end thereof a pair of horizontally projecting branch pipes 140 which are secured at their inner ends to an upper coupling 141 fixed on the upper end of the pipe 133. The outer ends of the branches 140 are bent forwardly as indicated at 142, and spray nozzles 143 are carried by the outer ends of the branches 140. These spray nozzles 143 are herein shown as being downwardly directed, but it will be understood that they may be adjusted through adjustment of the couplings 144 carried by the outer ends of the branches 140, to discharge the insecticide at any desired angle relative to the vertical.

The coupling 138 has secured thereto a pair of longitudinally curved branch pipes 145 and the branch pipes 145 have secured to the upper ends thereof spray nozzles 146. A pair of lower branch pipes 147 are secured to a lower coupling 148 carried by the lower end of the vertical pipe 133 and a pair of spray nozzles 149 are mounted on the outer ends of the pipes 147. An additional pair of branch pipes 150 are secured to the intermediate lower coupling 151 carried by the pipe 133, and spray nozzles 152 are secured to the outer ends of the branch pipes 150.

The tank 51 has mounted in the top thereof a funnel 153 which engages in an opening 154 formed in the top wall 123 of the tank 51. The dome 129 includes a downwardly directed valved return nipple 155 for discharging excess insecticide into the funnel 153 for return to the tank 51.

Figure 9:
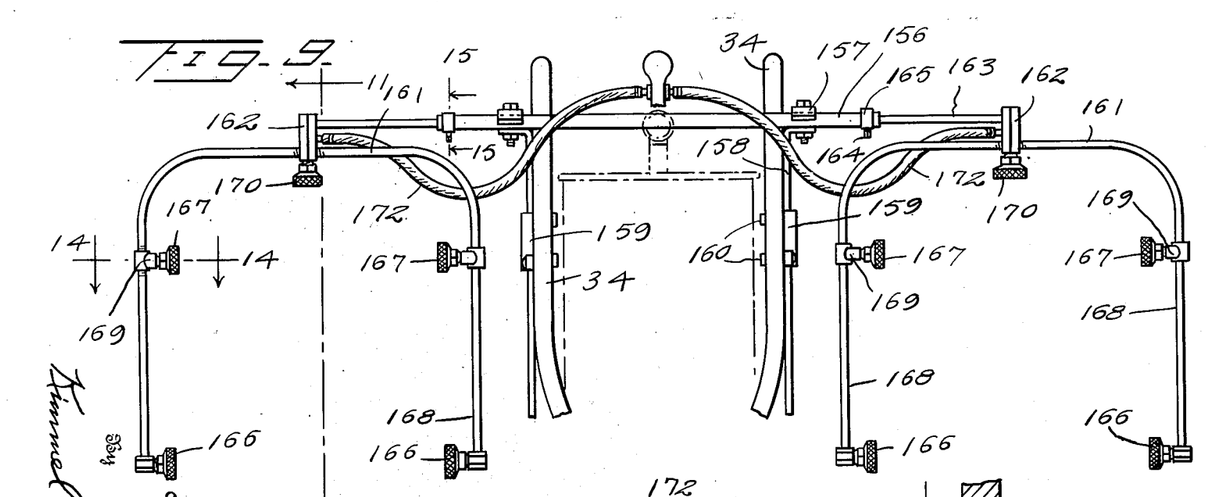
Figure 9 is a detail front elevation, partly broken away, of a modified form of spraying boom.
Figure 10:
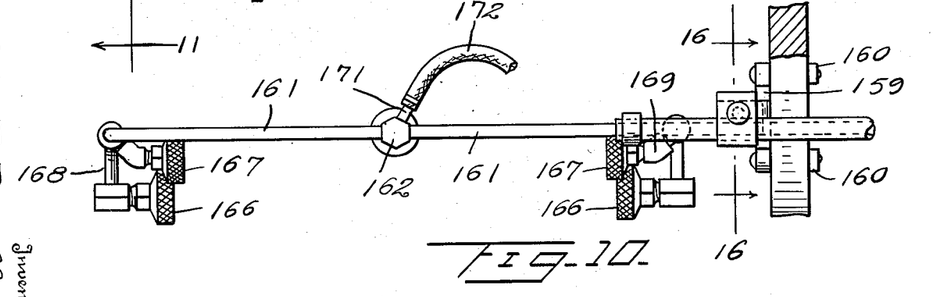
Figure 10 is a fragmentary plan view of the boom structure shown in Figure 9.
Figures 12, 13, 14, 15:
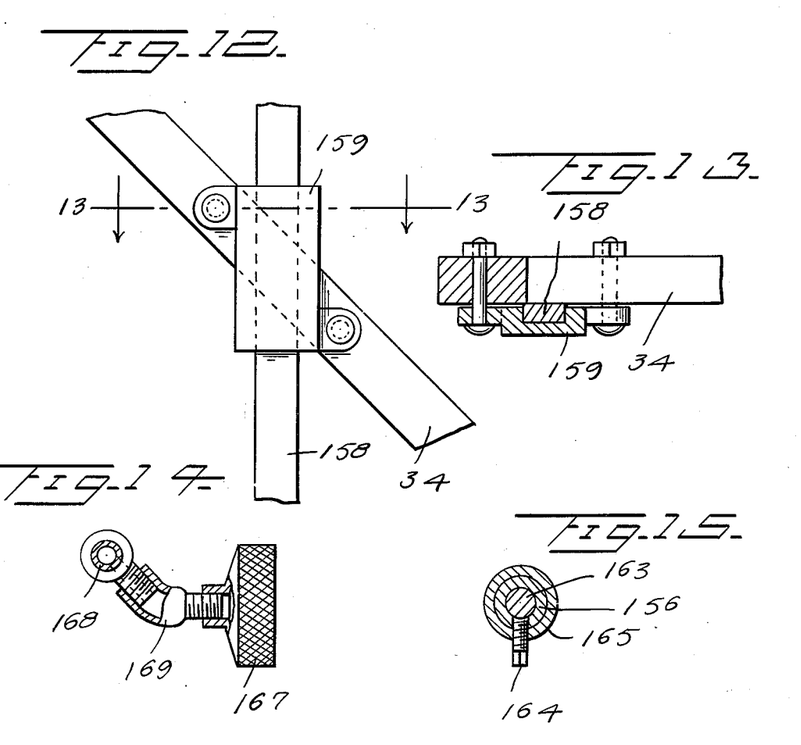
Figure 12 is a fragmentary side elevation of the boom supporting bracket embodied in Figure 9.
Figure 13 is a fragmentary sectional view taken on the line 13—13 of Figure 12.
Figure 14 is a sectional view taken on the line 14—14 of Figure 9.
Figure 15 is a sectional view taken on the line 15—15 of Figure 9.
Figure 16:
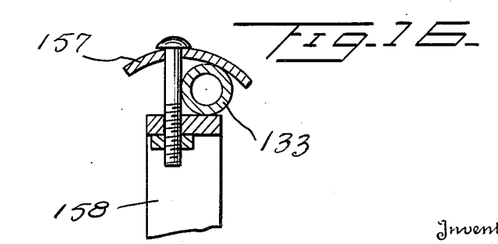
Figure 16 is a fragmentary sectional view taken on the line 16—16 of Figure 10.

Referring now to Figures 9 and 10, there is disclosed a modified form of spraying boom which includes a supporting pipe or tube 156 which is fixed by clamping members 157 to a pair of upwardly extending brackets 158. The brackets 158 are carried by clamping means 159 secured by fastening members 160 to the handles 34 at a point to the rear of the tank 51. A pair of inverted U-shaped pipes 161 are disposed one on each side of the machine, and each pipe 161 includes a coupling 162 having fixed thereto an elongated rod 163 which engages in the adjacent end of the supporting tube 156.

The rod 163 is fixed in adjusted position by means of a set screw 164 threaded through a collar 165 and threaded also through the tube 156. The pipe 161 has fixed thereto a pair of lower spray nozzles 166 which are inwardly directed, and an intermediate pair of nozzles 167 are secured to the vertical legs 168 of the pipe 161 above the nozzles 166. The nozzles 167 are secured to a 45° coupling 169 so that these nozzles 167 may be angularly adjusted to direct the spray either inwardly in a horizontal direction or at any desired inclination to the vertical. This inclination may be either upwardly or downwardly.

The upper spray nozzle 170 is carried by the coupling 162 and is adapted to direct the insecticide downwardly between the nozzles 166 and 167. The coupling 162 includes a rearwardly projecting nipple 171 which is adapted to be connected by a hose 172 to the discharge side of the pump.

Figure 17:
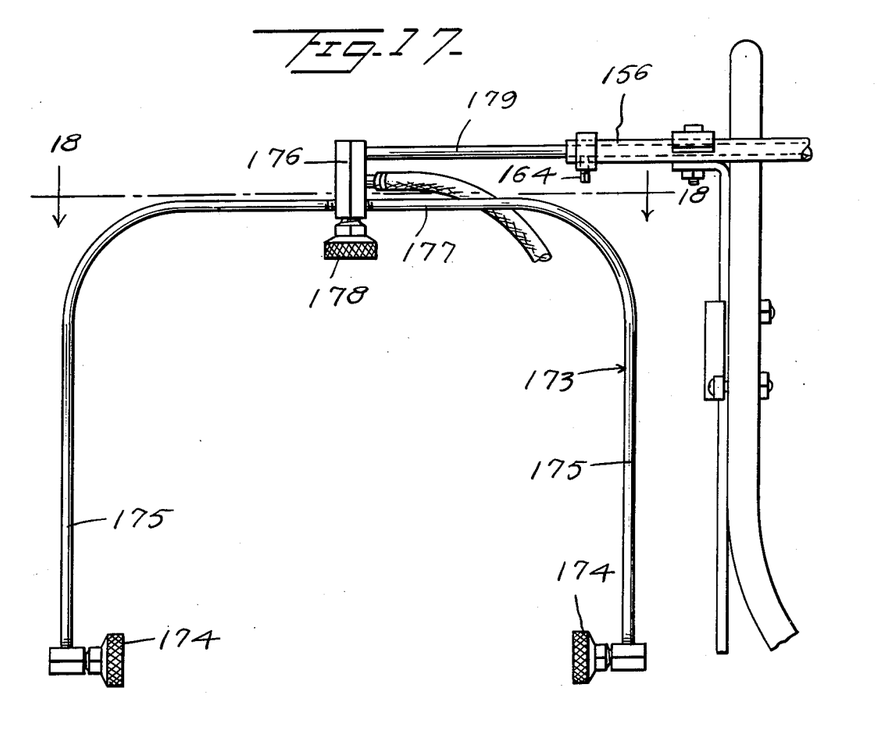
Figure 17 is a detail front elevation of another form of spraying boom structure.
Figure 18:
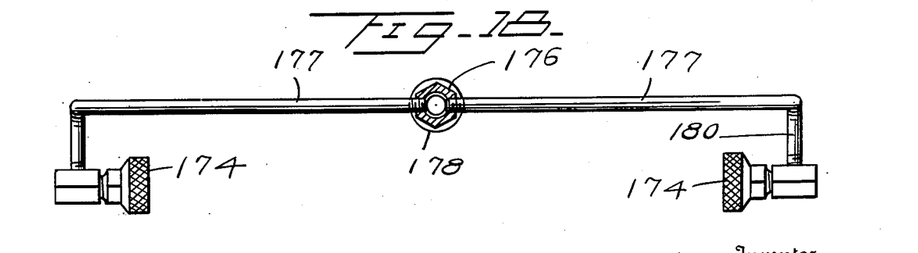
Figure 18 is a sectional view taken on the line 18—18 of Figure 17.

Referring now to Figures 17 and 18, there is disclosed another modified form of spraying boom embodying three spray nozzles for each side of the machine. An inverted U-shaped pipe 173 has a pair of confronting spray nozzles 174 mounted on the lower ends of the parallel legs 175 thereof, and a coupling 176 is secured to the bight 177 of the pipe 173, and an upper downwardly directed spray nozzle 178 is carried by the coupling 176. The coupling 176 includes a horizontally disposed supporting rod 179 which is engageable in the adjacent end of the horizontal supporting tube 156 and secured in adjusted position by means of a set screw 164. As shown in Figure 18, the lower ends of the vertical legs 175 are forwardly bent as indicated at 180, so as to offset the lower nozzles 174 forwardly from the upper nozzle 178.

Figures 19, 20, 21:
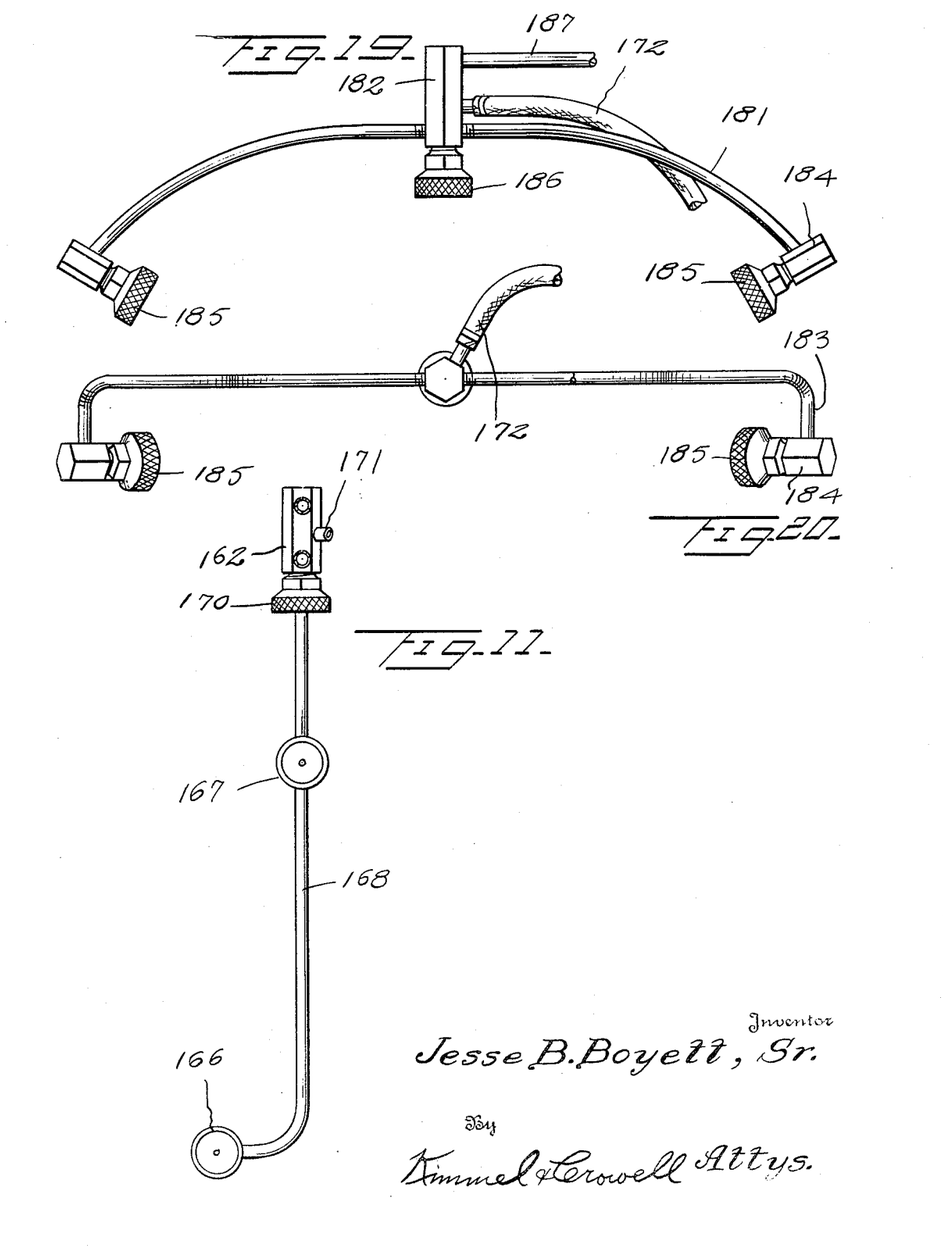
Figure 19 is a detail front elevation of another form of spraying boom structure.
Figure 20 is a detail plan view of a boom structure shown in Figure 19.

Referring now to Figures 19 and 20, there is disclosed another form of spray structure embodying a longitudinally bowed pipe 181 having a coupling 182 between the ends thereof. The longitudinally bowed pipe 181 is formed with forwardly projecting opposite ends 183 on which couplings 184 are secured, and spray nozzles 185 are secured to the couplings 184. The couplings 184 may be angularly adjusted so that the spray from the nozzles 185 may be directed either downwardly and inwardly or at any other inclination to the vertical. An intermediate or upper and downwardly directed nozzle 186 is carried by the coupling 182 for directing spray downwardly between the nozzle 185. A supporting rod 187 is fixed to the coupling 182 and is adapted to be adjustably secured to a supporting tube 156 as shown in Figure 9.

In the use and operation of this spraying machine the frame 25 may have connected therewith a tractor means such as a horse or tractor. The tank 51 may be filled through the opening 154 and as the machine moves between a pair of rows of plants such as tobacco, cotton or the like, rotation of the wheels 36 will effect operation of the pump with the pump cylinder 111 swinging or oscillating on the pivot member 115 as the piston 110 is reciprocated by means of the rotating crank 104. The pump 111 may be of such capacity that an excess of liquid will be pumped and this excess of liquid will be returned to the tank 51 by the return pipe 155 discharging into the funnel 153.

By providing different types of spraying booms the plants may be sprayed on both the under and upper sides thereof, and this spraying process may progress with the growth of the plant. As the plant grows taller the different spraying booms herein disclosed may be used so that the insects which are killed by contact will be properly sprayed in the different stages of the plant growth.

I do not mean to confine myself to the exact details of construction herein disclosed, but claim all variations falling within the purview of the appended claim.

What I claim is:

In a machine of the character described, a casing with a horizontal shaft operatively connected with a vertical pump shaft therein, bearing bushings engaging about said horizontal shaft, and a pair of anti-friction roller bearings mounted in said bushings, said bushings formed at their inner ends with an annular flange against which the inner ends of said roller bearings engage and a counterbore at the outer ends of said bushings within which a sealing member is mounted, with a metal washer interposed between the sealing member and the outer end of said roller bearings, each of said bearing bushings having an upwardly projecting lug secured to fixed external fastening means, a pair of collars engaging about said horizontal shaft and bearing at their outer sides against the inner ends of the bearing bushings to hold said horizontal shaft against endwise movement relative to the bearing bushings, said casing formed with flanges at its outer ends which engage annular grooves formed in the bearing bushings and an upwardly projecting bushing formed on said casing within which the reduced lower end of the bushing, rotatively supporting the vertical pump shaft, engages.

JESSE B. BOYETT, Sr.

REFERENCES CITED

The following references are of record in the file of this patent:

UNITED STATES PATENTS

| Number | Name | Date |
|---|---|---|
| 613,697 | Martin | Nov. 8, 1898 |
| 633,475 | Northam | Sept. 19, 1899 |
| 1,424,494 | Leyner | Aug. 1, 1922 |
| 1,434,578 | Alden | Nov. 7, 1922 |
| 1,492,108 | Schulz | Apr. 29, 1924 |
| 1,526,642 | Nissley | Feb. 17, 1925 |
| 1,679,691 | Smith | Aug. 7, 1928 |
| 1,810,489 | Ljungkull | June 16, 1931 |
| 1,978,186 | Buchanan | Oct. 23, 1934 |
| 2,022,584 | Boyett | Nov. 26, 1935 |
| 2,048,063 | Friedman | July 21, 1936 |
| 2,143,968 | Alden | Jan. 17, 1939 |
| 2,218,776 | Vaage | Oct. 22, 1940 |
| 2,230,899 | McGrath | Feb. 4, 1941 |
| 2,231,229 | Spreng | Feb. 11, 1941 |
| 2,241,606 | Kysor | May 13, 1941 |
| 2,277,635 | Delaval-Crow | Mar. 24, 1942 |
| 2,304,198 | Overstrom et al. | Dec. 8, 1942 |
| 2,386,946 | Greiner et al. | Oct. 16, 1945 |